(12) United States Patent
Schleich et al.

(10) Patent No.: US 7,116,243 B2
(45) Date of Patent: Oct. 3, 2006

(54) SYSTEM AND METHOD FOR AUTOMATIC METER READING WITH MOBILE CONFIGURATION

(75) Inventors: Michael Schleich, Newman Lake, WA (US); Jeffrey S. Sanders, Rathdrum, ID (US); Christopher L. Osterloh, Waseca, MN (US); Christopher Nagy, Waseca, MN (US)

(73) Assignee: Itron, Inc., Spokane, WA (US)

( * ) Notice: Subject to any disclaimer, the term of this patent is extended or adjusted under 35 U.S.C. 154(b) by 92 days.

(21) Appl. No.: 10/929,777

(22) Filed: Aug. 30, 2004

(65) Prior Publication Data

US 2005/0068194 A1 Mar. 31, 2005

Related U.S. Application Data

(60) Provisional application No. 60/500,515, filed on Sep. 5, 2003.

(51) Int. Cl.
*G08B 23/00* (2006.01)

(52) U.S. Cl. .......................... 340/870.02; 340/870.11; 702/180

(58) Field of Classification Search ........... 340/870.02, 340/870.11, 637; 705/401, 34, 180
See application file for complete search history.

(56) References Cited

U.S. PATENT DOCUMENTS

| | | | |
|---|---|---|---|
| 4,332,980 A | 6/1982 | Reynolds et al. | |
| 5,173,657 A | 12/1992 | Holsclaw | |
| 5,459,459 A | 10/1995 | Lee, Jr. | |
| 5,918,380 A | 7/1999 | Schleich et al. | |
| 6,020,734 A | 2/2000 | Grisham et al. | |
| 6,035,725 A | 3/2000 | Spendel et al. | |
| 6,078,785 A | 6/2000 | Bush | |
| 6,219,655 B1 | 4/2001 | Schleich et al. | |
| 6,304,191 B1 | 10/2001 | Campbell et al. | |
| 6,512,463 B1 | 1/2003 | Campbell et al. | |
| 6,651,030 B1 | 11/2003 | Victor et al. | |
| 6,778,099 B1 | 8/2004 | Meyer et al. | |
| 6,801,865 B1* | 10/2004 | Gilgenbach et al. | .......... 702/61 |
| 2004/0113810 A1* | 6/2004 | Mason et al. | .......... 340/870.02 |
| 2004/0263352 A1 | 12/2004 | Cornwall et al. | |
| 2005/0023347 A1* | 2/2005 | Wetzel et al. | .............. 235/385 |
| 2005/0240540 A1* | 10/2005 | Borleske et al. | ............ 705/401 |

* cited by examiner

*Primary Examiner*—Timothy Edwards, Jr.
(74) *Attorney, Agent, or Firm*—Patterson, Thuente, Skaar & Christensen, P.A.

(57) ABSTRACT

An automatic meter reading (AMR) system and a method of operating an AMR system are disclosed. The AMR system stores and transfers consumptive data, demand data, and data archives. The system and method can also provide a demand reset to reduce or eliminate the need to physically visit a remote endpoint device, for example a residential utility meter, to directly connect to the endpoint device for the collection of data. The system and method provide two-way wireless communication between at least one reader and a plurality of remote endpoint devices and are adapted for use with mobile readers. The AMR system and method therefore provide efficient and reliable storage and transfer of data, including high volumes of data, at mobile read rates.

12 Claims, 7 Drawing Sheets

SYSTEM AND METHOD FOR AUTOMATIC METER READING WITH MOBILE CONFIGURATION

RELATED APPLICATION

The present application claims the benefit of U.S. Provisional Application No. 60/500,515 filed Sep. 5, 2003, which is incorporated herein in its entirety by reference.

FIELD OF THE INVENTION

The present invention relates generally to radio frequency (RF) communication systems, and more particularly to RF communication schemes used with remote automatic meter reading (AMR) devices.

BACKGROUND OF THE INVENTION

Automatic meter reading (AMR) systems are generally known in the art. Utility companies, for example, use AMR systems to read and monitor customer meters remotely, typically using radio frequency (RF) communication. AMR systems are favored by utility companies and others who use them because they increase the efficiency and accuracy of collecting readings and managing customer billing. For example, utilizing an AMR system for the monthly reading of residential gas, electric, or water meters eliminates the need for a utility employee to physically enter each residence or business where a meter is located to transcribe a meter reading by hand.

There are several different ways in which current AMR systems are configured. In a fixed network, endpoint devices at meter locations communicate with readers that collect readings and data using RF communication. There may be multiple fixed intermediate readers located throughout a larger geographic area on utility poles, for example, with each endpoint device associated with a particular reader and each reader in turn communicating with a central system. Other fixed systems utilize only one central reader with which all endpoint devices communicate. In a mobile environment, a handheld or otherwise mobile reader with RF communication capabilities is used to collect data from endpoint devices as the mobile reader is moved from place to place.

AMR systems that are currently available are generally one-way, one-and-a-half-way, or two-way systems. In a one-way system, an endpoint device periodically turns on, or "bubbles up," to send data to a receiver. One-and-a-half-way describes systems in which a receiver sends a wake-up signal to an endpoint device, which in turn responds with a reading. Two-way systems enable command and control between the endpoint device and a receiver/transmitter.

U.S. Pat. No. 5,918,380 to Schleich et al., for example, discloses a metering system for metering the consumption of electrical energy that includes an encoder device for transmitting a RF signal and a receiver device for receiving the radio frequency signal transmitted by the encoder device. The encoder device periodically generates an encoded RF signal for transmission and the receiver device has a decoder for decoding the encoded RF signal received from the encoder device.

U.S. Pat. No. 5,914,673 to Jennings et al. relates to an AMR system of the type used for reading utility meters by using a fixed RF network. The system disclosed by Jennings et al. is a network comprised of multiple cells, with each cell containing a single data concentrator unit and a typically large number of meter interface units. In operation, each meter interface unit is assigned a unique time displacement number and responds to a meter reading request from a data concentrator unit based upon its time displacement number.

While one-way and one-and-a-half-way systems provide many advantages over manual read meters, they do not fully enable two-way communication between receivers and endpoint devices. As the demands of energy metering increase, additional functionality requirements will drive new technological solutions.

For example, it is desirable for a utility to be able to reset a meter after collecting the meter's demand reading. A demand value is the highest, or peak, power demand over a unit of time. Systems currently available allow a demand reset to be calendar scheduled, but this approach disconnects the demand reset from the meter read and results in a mismatch of timestamps that is not favored by utilities. In these systems, recognition of the reset event is not provided proof-positive to the meter reader and inference rules must be applied. This impacts the business rules of many utilities and is not desirable. Other systems may allow a demand reset command to be sent to an endpoint device but do not provide any confirmation that the command was received and executed, resulting in erroneous readings and, ultimately, an unreliable system.

Further, while the demand is generally monitored by a utility on a monthly basis, it is frequently desirable to be able to archive the demand value, or other interval data, for a period of time, perhaps two or three months. This requires the endpoint devices and readers to have increased data storage and transfer capabilities that are not available in current AMR systems. Further, proof positive demand reset coupled with a reading of the demand information from an endpoint device is usually accomplished through a physical interface with the endpoint device in AMR systems that are currently available.

There is, therefore, a need for an AMR system that addresses the data collection shortcomings described above.

SUMMARY OF THE INVENTION

The invention disclosed herein substantially meets the aforementioned needs of the industry, in particular a system and method of operating AMR systems that allow for the storage and transfer of information such as demand reads and data archives. The system and method can also provide for configuration control (e.g. demand reset; remote disconnection of the meter; change in time of use bins and seasonal bins) in a manner that is communicatively reliable, particularly at mobile read rates, to eliminate the need to physically visit a remote endpoint device and connect directly to the endpoint device so as to activate the configuration event.

In one embodiment, the invention is directed to a system and method for mobile demand reset that provides two-way communication between an endpoint device and a reader (or transceiver). The mobile demand reset system and method provide efficient and reliable storage and transfer of data with implicit configuration command reliability, at mobile read rates and are an improvement over prior art AMR systems that utilize one-way or one-and-a-half-way communication.

The invention enables true demand reset functionality. In a series of communications between a reader (or transceiver) and an endpoint device, consumption, demand, and demand reset requests and responses are exchanged, where the reader and endpoint device are part of a system that comprises either mobile or fixed readers and a large number of endpoint devices distributed throughout a geographic area. In one embodiment, six communications are exchanged: 1) a wakeup preamble and request for consumption data is sent from a reader to an endpoint device; 2) a current consumption value is sent from the endpoint device to the reader; 3) a request for demand data is sent from the reader to the endpoint device; 4) demand data is sent from the endpoint device to the reader; 5) the reader acknowledges receipt of the demand data and requests a demand data reset from the endpoint device; and 6) the endpoint device communicates confirmation of the demand data reset to the reader. A reset at the time of demand reading from the meter guarantees that the next billing cycle starts precisely at the time of the meter read, eliminating errors in the read. Additional communications can occur for retransmission of corrupted or incomplete data or requests, or for a final acknowledgement by the reader of receipt of the demand data reset confirmation.

In another embodiment, only two communications between a reader (or transceiver) and an endpoint device are executed to exchange the demand data and demand data reset communications. In this embodiment, each endpoint device includes a timer around which an algorithm wraps communications and processing to provide highly reliable demand reset functionality once initiated by a single command from a reader. When coupled with typical utility business rules, reliability is managed so as to offer a highly reliable solution.

The mobile demand reset system and method of the invention also provide efficient and reliable storage and transfer of data, including high volumes of data, at mobile read rates. In one embodiment, the system and method provide for the collection, storage, and transfer of interval data, or other large data sets, between endpoint devices and readers in an AMR system while retaining system compatibility with simpler endpoint devices that do not collect, store, or transfer interval data.

The Demand Reset functionality, as it is commonly referred to in industry, is but one of many operational scenarios where there is a need to communicatively couple a control signal to the meter. A parallel scenario is the initiation of a remote disconnect at the meter. Technology today offers switches which can be placed within the meter that can be triggered to close (turn on power) or open (turn off power) by utility field personnel. Similar to that of existing demand reset functions, a site visit with a physical interaction is needed to change the state of the switch. Although one-way wireless technology exists to initiate a disconnect remotely, it can't offer reliable proof of a successful disconnect. Two-way technologies exist, but are cost prohibitive for mass market deployment. The various embodiments of the invention overcomes these drawbacks.

Another example of where reset functionality would be useful is in changing Time of Use bins within a meter. Time of Use is a common electric billing approach where a meter collects energy consumption for a specific period of time over a 24 hour day, and the consumer pays their tariff based on the energy consumed within each Time of Use bin. For instance, a utility may offer a simple 2-bin Time of Use Rate. For electricity consumed between 7 pm and 7 am (over night), a low tariff would apply (e.g. $0.04/kWh) while from 7 am to 7 pm (during daylight) a higher tariff would apply (e.g. $0.07/kWh). Such a model financially incents the consumer to use energy at the utilities 'off peak' rate, thereby shifting the usage and flattening their load. In such rates, it is common to have Winter and Summer 'bins' and reprogramming these bins had required a physical interconnect.

The above summary is not intended to describe each illustrated embodiment or every implementation of the invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
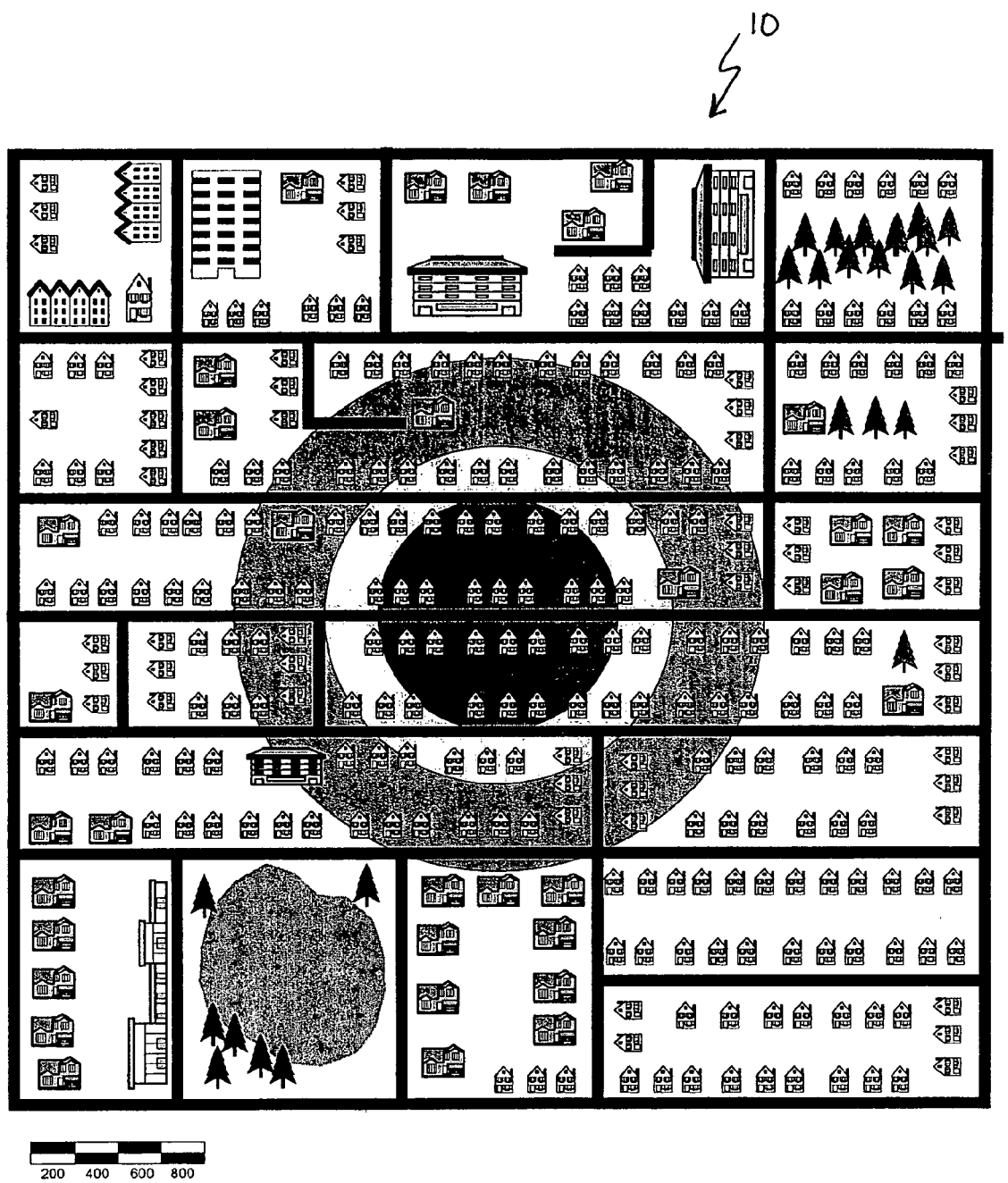
FIG. 1 is an exemplary diagram of a typical residential area in which one embodiment of the mobile AMR system can be deployed.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The mobile demand reset system and method of the invention as disclosed herein provide true demand reset functionality and enable collection of interval or other large set data in a mobile environment. The invention can be more readily understood by reference to FIGS. 1–9 and the following description. While the invention is not necessarily limited to such an application, the invention will be better appreciated using a discussion of example embodiments in such a specific context.

FIG. 1 is an exemplary diagram of a typical residential area 10 in which one embodiment of the mobile AMR system of the invention can be deployed. A typical residential area will comprise areas of varied densities, including, for example, single- and multi-family homes, apartment complexes, residential medical facilities, educational centers, and distributed areas of commercial zoning.

Figure 2:
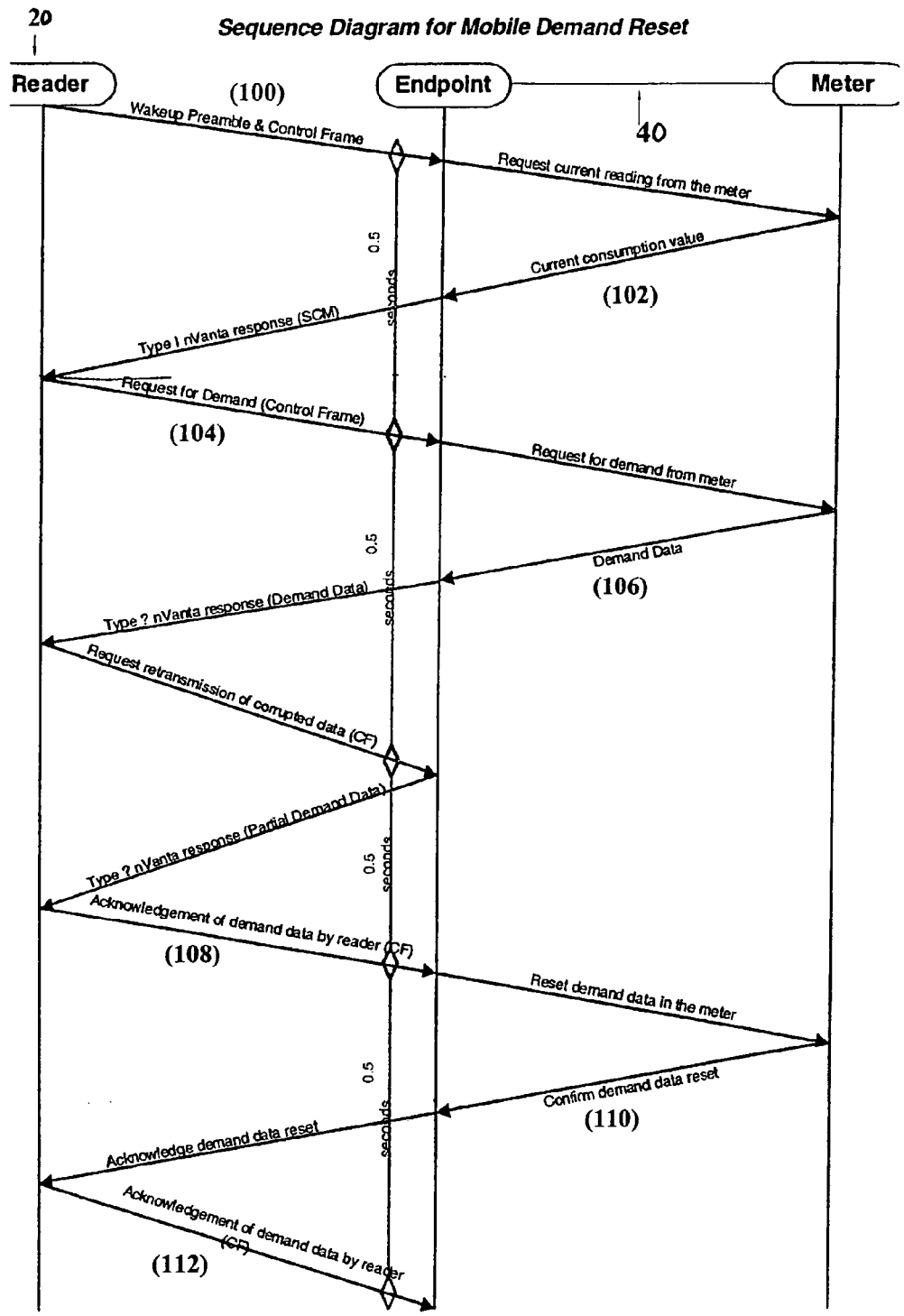
FIG. 2 is a sequence diagram of one embodiment of the mobile demand reset method of the invention.

To operate efficiently and accurately in such an environment, the mobile demand reset system and method, as part of an AMR system, utilize a two-way mobile protocol. FIG. 2 is a sequence diagram of one embodiment of the mobile demand reset method. When an endpoint device 40 hears a recognized wakeup command and request (100) from a reader 20, the endpoint device 40 responds with the requested message and the endpoint device's 40 unique identifier (102). Here and throughout this application the term "endpoint device" will be used to generally refer to the meter and communications circuitry as one remote device even though they may in some embodiments be distinct devices, with a reader (or transceiver) communicating with the communications circuitry and the communications circuitry in turn communicating with the actual meter. After receiving the identifier, the mobile reader 20 will look in its database to determine if the endpoint device 40 supports demand reset. If the endpoint device 40 does support demand reset, the mobile reader 20 will request the current demand information from the endpoint device 40 in the next command frame and await a response (104). If the request (104) fails, the data will be requested again. When the inbound demand response (106) is verified, the mobile reader 20 will instruct the endpoint device to reset its demand registers (108). The endpoint device 40 will then respond to the mobile reader 20 with a confirmation that the demand registers have been reset (110) and the mobile reader 20 will acknowledge (112).

In another embodiment, the above-described algorithm can be shortened and simplified by geo-coding the locations of the demand reset-enabled endpoint devices and adding this information to the database of the mobile reader. With the addition of a global positioning system (GPS) or other position location system receiver in the mobile reader, the mobile reader can preemptively request demand data from compatible endpoint devices in the system that the mobile reader determines should be in range of its present location. This capability reduces the steps in the mobile demand reset algorithm, saving time in the overall cycle, increasing efficiency, reducing the number of communications links subject to error, and generally allowing a mobile reader to progress through a given geographic area and collect data faster.

Figure 3:
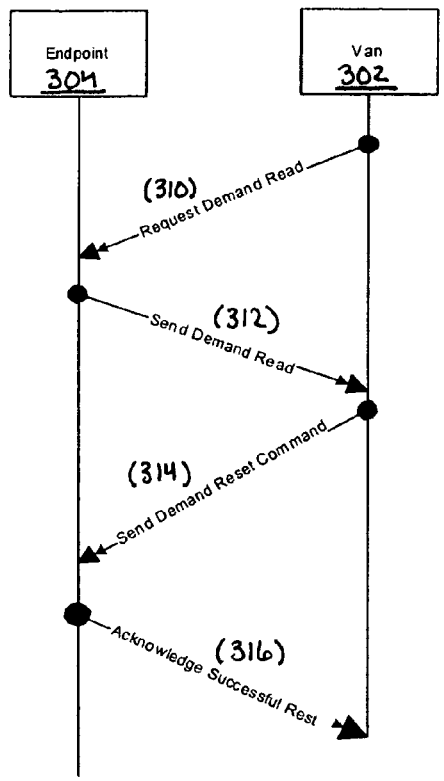
FIG. 3 is a sequence diagram of a demand portion of the mobile demand reset method of the invention.

FIG. 3 is a sequence diagram of one example embodiment of a demand portion of the mobile demand reset (or remote configuration) method. In the method depicted in FIG. 3, a mobile reader 302, in this example a van, and one endpoint device 304 of a plurality of endpoint devices in a utility meter system, exchange a series of four communications 310-316. The mobile reader 302 sends a first communication 310 to an endpoint device 304, requesting a demand read. The endpoint device 304 replies by sending a current demand read 312 to the mobile reader 302. After receiving the demand read, the mobile reader sends a demand reset command 314 to the endpoint device 304, and the endpoint device 316 acknowledges the successful reset in a final communication 316 with the mobile reader 302.

Figure 4:
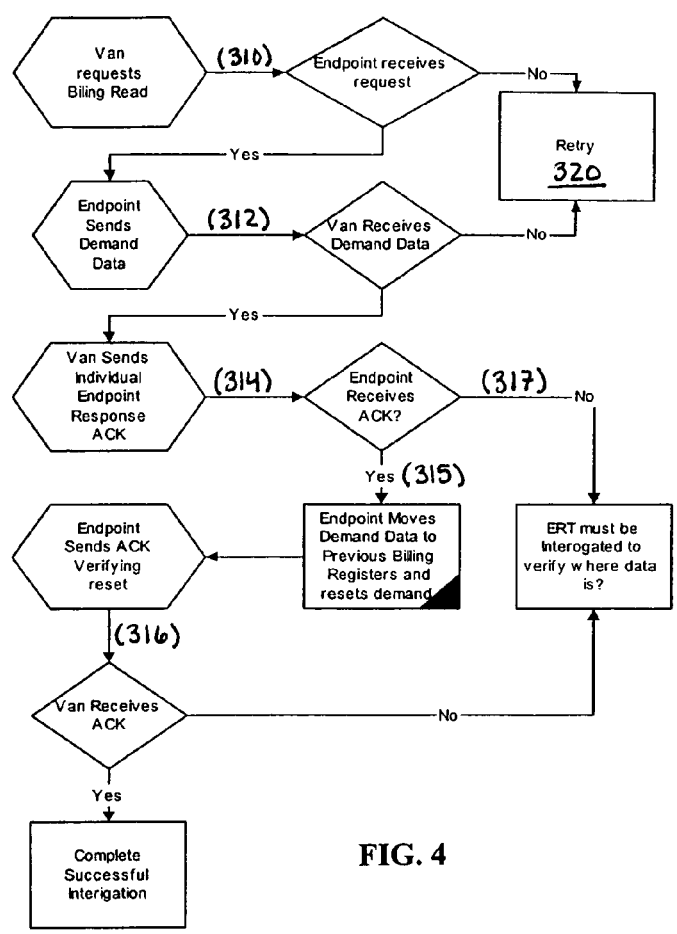
FIG. 4 is a flowchart of the demand portion of the mobile demand reset method of the invention corresponding to the embodiment of FIG. 3.

FIG. 4 is a flowchart of the mobile demand reset method that includes the demand portion of FIG. 3. In this method, mobile reader 302 requests a billing read from endpoint device 310. If endpoint device 304 does not receive the request, mobile reader 302 will retry (320). After endpoint device 304 successfully receives the request, device 304 responds to mobile reader 302 by sending demand data (312). If mobile reader 302 does not receive the demand data, endpoint device 304 will retry (320). Mobile reader 302 next sends an individual endpoint device 304 response acknowledgement (314). If endpoint device 304 successfully receives acknowledgement, device 304 moves its current demand data to the device's 304 previous billing registers and resets the current demand (315). If endpoint device 304 did not receive the acknowledgement, device 304 is interrogated by mobile reader 302 to verify the demand data (317). After endpoint device 304 successfully resets its demand data (315), device 304 sends a reset verification acknowledgement to mobile reader 302 (316). The above described method and others described herein are not necessarily limited to demand resets. It is applicable to remote configurations that include time of use bins, seasonal usage bins and disconnection of a meter or a utility measurement device.

While this method substantially meets the aforementioned needs, it may require additional and repeated communications sequences in a mobile environment where many two-way communications may be taking place at mobile reader speeds that sometimes exceed 30 miles per hour. Consider the example with a single communications link read reliability of 98%. A sequence of four consecutive successes in the communications chain occurs only about 72% of the time, requiring heavy communications overhead to enable an appropriate level of success, or forcing the mobile reading device to slow down significantly. Thus, while the above described embodiment may be successfully applied in certain environments, a more communicatively robust solution is also desired.

In accordance with another embodiment of the invention, the mobile demand reset system and method as described above are further simplified to comprise fewer communications link-ups between a reader and an endpoint device, reducing the likelihood of transmission errors, interference with other local devices, and the like, while achieving the collection of both demand data and an acknowledgement of proof positive demand reset.

Figure 5:
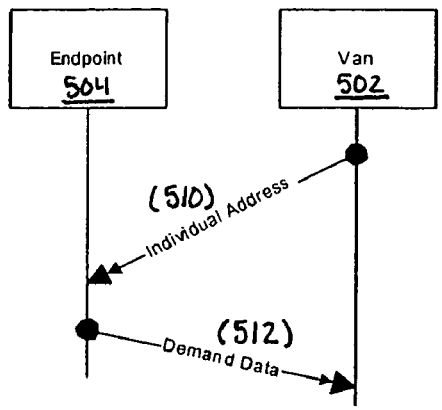
FIG. 5 is a sequence diagram of another embodiment of the mobile demand reset method of the invention.

FIG. 5 is a sequence diagram of another embodiment of the mobile demand reset (or remote configuration) method. As depicted, this embodiment comprises two communications between a mobile reader 502 and an endpoint device 504. Mobile reader 502 requests data by addressing an individual endpoint device requesting a demand read (510), and that endpoint device 504 replies by sending the requested demand data (512).

Figure 6:
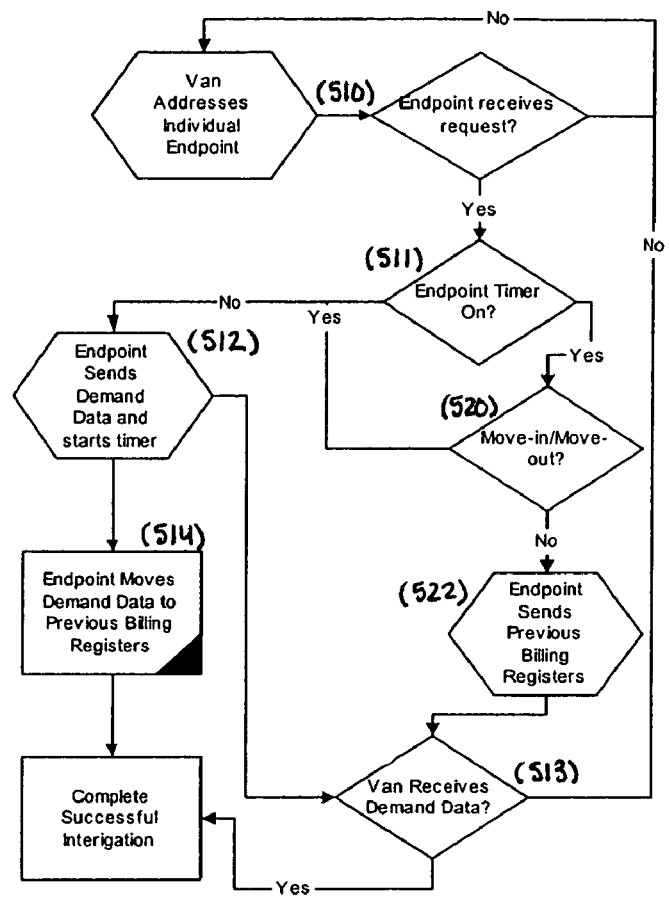
FIG. 6 is a flowchart of the mobile demand reset method of the invention corresponding to the embodiment of FIG. 5.

FIG. 6 is a flowchart of the mobile demand reset method corresponding to the embodiment of FIG. 5. A timer in the endpoint device assists in enabling this embodiment, wherein an algorithm wraps communications and processing around the timer to provide for highly reliable demand reset functionality that occurs simultaneous to the meter read. This approach places the responsibility for communications and functionality reliability on the reader and the utility's business rules, rather than on the unmanned and remote endpoint devices.

In this embodiment, upon receiving an appropriately addressed read request from mobile device 502 (510), endpoint device 504 sends the demand data to the reader and starts a timer 512, then pushes the existing demand information into a "previous billing cycle" register and resets the current cycle demand register 514. While additional communications may be needed in case of errors, this embodiment reduces the number of communications links required.

To account for communications complications, endpoint device 504 starts a timer upon recognition of a read request from the mobile reader (511, 512). This timer has a maximum duration that is configurable at endpoint device 504 installation. A typical duration for this timer might be approximately several days to a week, typically a time period that requires a particular utility's business rules to capture missed reads. Thus, the timer accounts for cases in which mobile reader 502 does not collect the read, hence a missed read case. In a missed read case, the mobile reader 502 does not decode initial endpoint device 504 response, triggering a subsequent "missed read" event either real-time during the read route or via post processing of the route information at the utility. A missed read event triggers the utility to reread endpoint device 502. If a missed read event is caught during the route, the utility employee can attempt another drive-by to collect the reading. If it is not caught until post processing, a contingency read can be requested based upon the utility's particular business rules.

In a missed read situation (513), a request is given to endpoint device 504 from mobile reader 502. As previously described, endpoint device 504 pushed the current cycle demand to a new register, reset the demand, and responded to mobile reader 502 with the demand information. After the initial request, any subsequent demand read occurring within the timer window causes endpoint device 504 to respond with the demand reading and time stored during the request for an initial read 522. It is significant to note that while the timer is executing, the current cycle demand is being monitored and registered independently.

An exception to this case is a move-in/move-out read (520) before the timer expiration. In this scenario, a new demand read is required during the timer period. This command (520) causes endpoint device 504 to generate a new demand message with a new time stamp, send that message to reading device 502, and restart timer 512. A different command request string when addressing endpoint device 504 allows this to be distinguished from the preceding case. Any subsequent move-in/move-out requests (520) would not force a reset of the demand and the timer until the timer for the originating move-in/move-out has expired. A request during the timer cycle that is not a move-in/move-out request will cause endpoint device 504 to respond with the stored demand data (522) as previously described with regard to a missed read situation.

Another exception would be a mid-cycle read during which the utility is interested in collecting the demand data but does not want a reset. Under this model, accomplishing the mid-cycle read occurs with an appropriately configured additional command set that requests current demand without reset. This read has no impact on the timer.

Although not shown in FIG. 6, a supplemental command is also included within this concept. In this example embodiment, the supplemental command facilitates a demand read request without a demand reset being triggered within the endpoint. This would be initiated via a unique control block in the initial request to the endpoint device, such that it knows to transmit the data but not do a reset. This would be a feature used mostly for diagnostic purposes.

As can be seen in FIG. 5 as compared to FIG. 3, the chance of a communication disruption between reader 302/502 and endpoint device 304/504 is much lower by virtue of halving the number of communications link-ups used to transfer the same data and information. This provides a higher success rate in these types of billing reads.

In other embodiments of the system and method, a group addressing scheme can be used, as opposed to the individual address approach described above, where the communications bandwidth is adequate. GPS or another position location determinative system can be combined with the mobile route to indicate when to address individual endpoint devices for which a two-way session can be established. Because meter clock synchronization is a valued function, the initial individual address command could include a clock synchronization frame that allows an endpoint device to test itself against the synchronization signal (for example, a GPS coordinate), recalibrate if necessary, and send an out-of-sync flag back to the reader. Further, these embodiments apply well to general telemetry applications and their functionality can be applied to other non-consumptive metered items, for example power quality or voltage. The above-described embodiments are also extensible to fixed network models in addition to mobile and handheld systems.

In addition to collecting consumption and demand data, utilities may also wish to collect interval, or other large set, data. Frequently this data will only be desired from a portion of the endpoint devices in a system. One embodiment of the system of the invention provides an integrated system that provides mobile compatibility with both simple consumption endpoint devices and more complex interval data endpoint devices that archive and transfer larger amounts of data.

A fixed network can easily support the collection and transfer of interval data because the network's devices can read data more frequently and are designed for higher volume data transfer. Mobile units, either handheld or vehicle-mounted, are more significantly impacted. If an endpoint device is storing 15-minute data "buckets" for 40 days, the endpoint device must transmit approximately 8000 bytes of data to the reader. This requires larger data storage capability than a simple consumption endpoint device and creates data transfer difficulties where vehicle-mounted readers are moving through an endpoint device area quickly.

For example, if a vehicle is moving at an average of 30 miles per hour, it will travel 440 feet in 10 seconds. The vehicle will also have a communications radius of approximately 500 feet, given a 1400 megahertz (MHz) system operating at a data rate of 38.4 kilobytes per second (KBPS) with the expected power levels and receiver sensitivities (+14 dBm endpoint transmit power, −109 dBm receiver sensitivity in the vehicle, 20 dB margin, endpoint device at 5 feet). Margin is included because the interval data is much longer than other messages and is not repeated unless an error occurs. For desired read reliability, each endpoint device would be in range of the vehicle-mounted reader for, on average, approximately 12 to 25 seconds. This is an appropriate amount of time in which to wake up an endpoint device, identify the device, request interval data be sent, receive the interval data, and repeat the request and receive portions, if necessary. Preferred system performance occurs if each endpoint device is in range for 15 seconds, which allows for a complete request and retry loop. To provide this and improve system performance, a GPS receiver can be included in the vehicle to provide location information that allows the system to determine the vehicle's present location and request an interval data response from nearby endpoint devices before the vehicle requests and receives endpoint device identification. Such a GPS-equipped system would save one frame, or five seconds, in the cycle time, providing full retry capability for endpoint devices out to the edge of the coverage ring even with full 20 dB margin.

Figure 7:
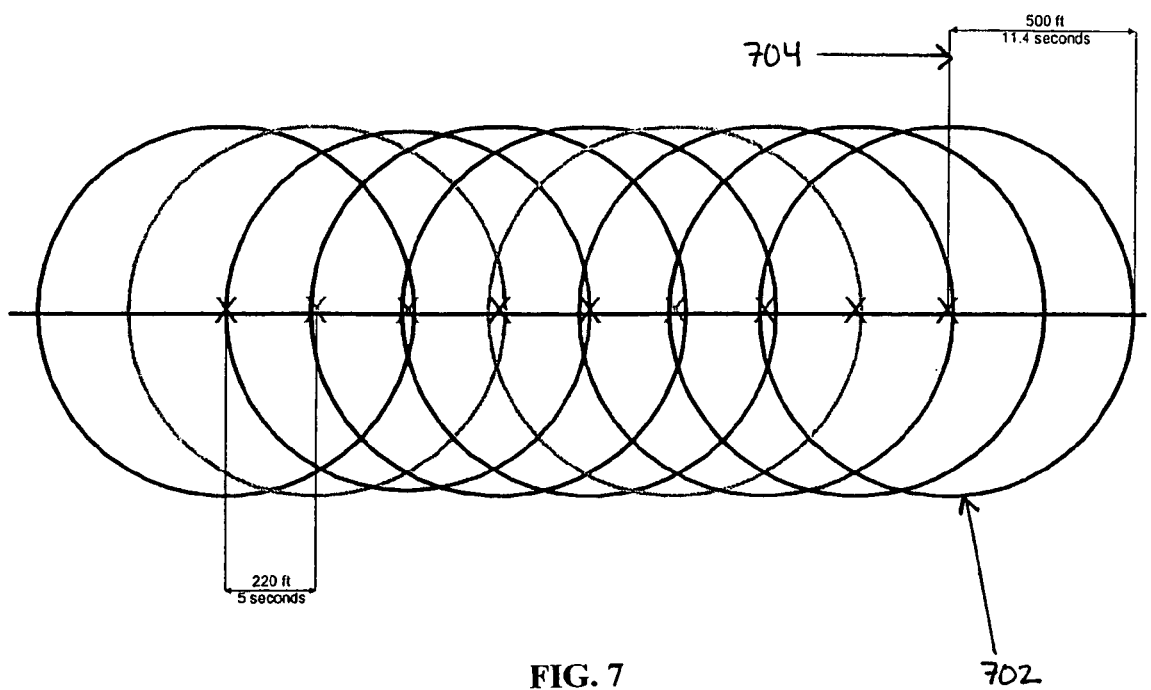
FIG. 7 is a diagram of mobile coverage radii in accordance with one embodiment of the invention.

FIG. 7 is a diagram of mobile coverage radii in accordance with one embodiment of the invention. As the vehicle moves through the system, about 25% of the meters covered will go out of range every frame and be replaced with approximately 25% new meters that are just coming into receive range of the vehicle. Thus, only about 25% of the meters in a given coverage radius 702 will be in the interval data response portion of the cycle in any given frame. The remainder will either be in an identification or other transmission state. Therefore, under normal operation, the system can support about four times the number of interval data meters that it can handle in a single frame.

In a geographic area with the standard residential endpoint device density of 1.3 endpoint devices per acre, about 20 endpoint devices will be within the 500-foot coverage radius 704 of the vehicle at any given time. TABLE 1 provides examples of various maximum numbers of buckets per meter based upon the meter density for an interval data only system.

TABLE 1

| Meter Density/<br>Bucket Size | 1.3/acre<br>832/square<br>mile | 2.6/acre<br>1664/sq.<br>mile | 3.9/acre<br>2496/sq.<br>mile | 5.2/acre<br>3328/sq.<br>mile |
|---|---|---|---|---|
| 2 Bytes | 4000 | 2000 | 1000 | 500 |
| 3 Bytes | 2666 | 1333 | 666 | 333 |

In a system with both standard consumption endpoint devices and interval data endpoint devices, the number of meters that can be supported will generally depend on the data load and the number of each type of endpoint device. In geographic areas that are denser, the speed of the vehicle can be decreased to allow enough time for communication with all the endpoint devices.

In another embodiment, a handheld unit is used in such areas, using the same protocol timing as the vehicle system but operating on a single channel. Strategically placed fixed network sites can also be utilized in other embodiments. An additional consideration in this embodiment is data storage in the handheld unit. For example, with 2000 endpoint devices to read per day and 8 Kbytes of data per endpoint device to collect, the handheld unit must be capable of storing approximately 16 Mbytes of data. This can be accomplished using a standard flash memory card in the handheld unit. The vehicle-mounted reader will collect data from a maximum of 30,000 endpoint devices per day with a data size of 8 Kbytes per device. Thus, the vehicle-mounted reader must be capable of storing 240 Mbytes of data per day, which is within range of currently available technology.

Figure 8:
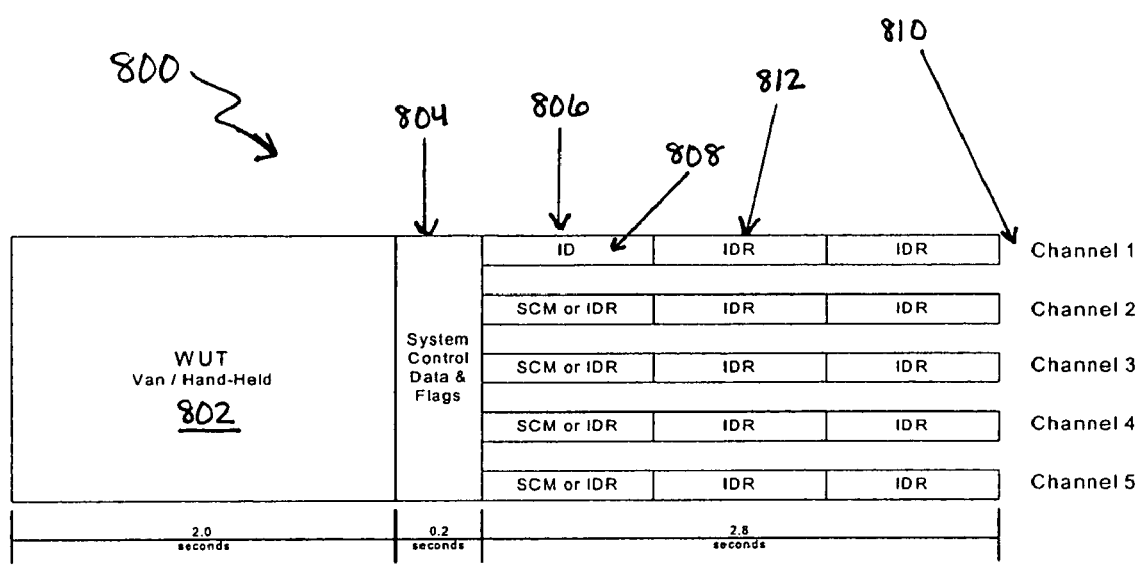
FIG. 8 is a diagram of a basic frame structure of one embodiment of the mobile demand reset method of the invention.

FIG. 8 is a diagram of a basic frame structure 800 of one embodiment of the mobile demand reset method. This frame 800 is repeated every five seconds as a vehicle moves through a system. The wake up tone 802 triggers the super-regenerative receiver in each of the endpoint devices (804), at which time they will respond with either a data reading or their identification number or code (806), depending upon their specific programming. If the vehicle receives device identification in sub-frame 1 (808) of channel 1 (810), the vehicle will schedule the endpoint device to transmit its interval data in one of the available interval data slots in the next frame (812). If the endpoint device has a consumption message to transmit the endpoint device will come up on one of the channels or time slots designated for these messages and will transmit the data five times at random intervals. If GPS location information is used, the vehicle can preemptively transmit an interval data request before it reserves the identification information from an endpoint device, saving one frame in the request cycle. In one embodiment, the choice between standard consumption data and interval data can be triggered by a different wake up tone or control byte.

Figure 9:
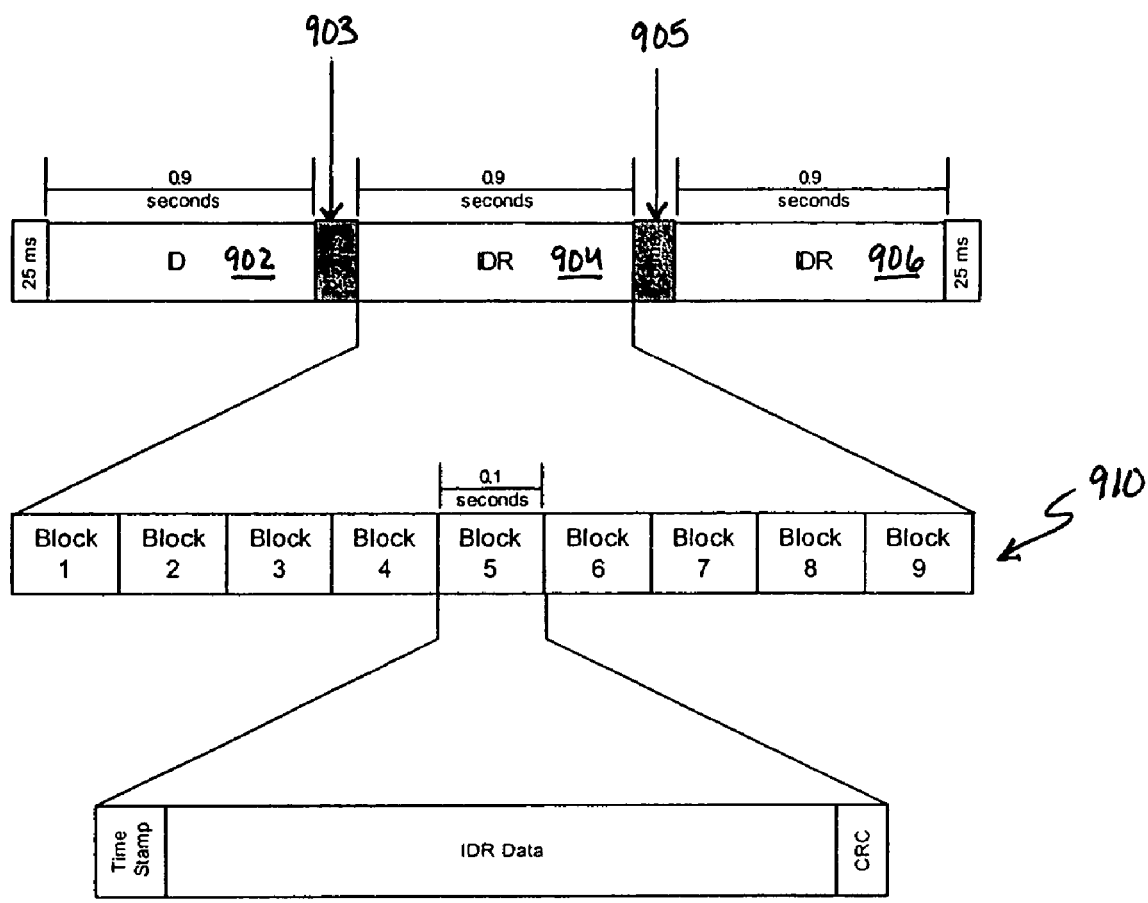
FIG. 9 is a diagram of a channel subdivision in accordance with one embodiment of the mobile demand reset method of the invention.

FIG. 9 is a diagram of a channel subdivision in accordance with one embodiment of the mobile demand reset method of the invention. Each channel is subdivided as shown with 0.9 seconds dedicated to each subframes 902–906. A guard band 903, 905 of 25 milliseconds (ms) between subframes 902 and 904, and 904 and 906, is included to ease timing accuracy requirements in the endpoint devices and the reader technology. Subframes 902–906 will again be divided into 100 ms blocks 910 with independent CRC information. The mobile reader can then request that an endpoint device resend only the missed fragments of the message without having to retransmit the entire 0.9 seconds of data. This configuration will conserve system bandwidth in cases where there is a data loss in the response path. An additional benefit to the individual CRC is that the microcontroller in the endpoint device can calculate the CRC for the blocks when they are written to memory instead of when the endpoint device is busy transmitting data during the read cycle.

In another example embodiment related to FIG. 2, a communications scheme is provided that achieves a command and acknowledgement function between a reader/transceiver and a endpoint/meter. In particular, the reader/transceiver and (herein after "reader") sends a command (e.g. a demand; see 104) to endpoint 40 and receives data 106 (e.g. demand data) from endpoint 40. Reader 20 then sends an acknowledgement (or ACK) 108 to endpoint 40 and receives and an ACK from endpoint 40.

In another related embodiment, which is a variation of FIGS. 2, 3 and 5, a communications scheme is provided that achieves a command acknowledgement in only two steps. In the first step, the reader/transceiver sends a command or request for data. The receipt of requested data or configuration parameter, in a second step of the communications scheme, is equivalent to a receipt acknowledgement. In this example embodiment, the wake-up tone within the command includes a special request for data or a configuration command parameter.

In another embodiment, the endpoint device is programmed with a special algorithm that provides for a back-up capability of storing the previous month's data (such as demand data) or historical data in a pre-defined storage register in the endpoint for a pre-defined (and programmable) time period. In the case where an acknowledgement is not registered at the reader, this feature facilitates a subsequent data download where the initial data request/attempt was unsuccessful. The mobile collector can then return at a later date to obtain the uncollected data or the utility can simply skip the reading and the data will automatically be cleared from the register. In either case, once the data is collected from the endpoint device, a new billing cycle is initiated and the data is cleared out from the register.

In a related embodiment, a temporary billing register is used to store old billing data without initiating a reset. In this and various embodiments, the mobile collector can request demand data, consumption data, power quality data or a disconnection of the meter.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A remote configuration system for an automatic meter reading (AMR) system comprising;
   at least one transceiver; and
   a plurality of endpoint devices, wherein each of the plurality of endpoint devices comprises a radio frequency (RF) communications device operably connected to a utility meter and adapted to communicate via RF with at least one reader;

wherein the at least one transceiver is adapted to request a utility reading in a first communication with each of the plurality of endpoint devices and receive therefrom a reading response in a second communication, wherein the transceiver is adapted to determine whether each of the plurality of endpoint devices supports a pre-defined configuration control parameter and wherein the at least one transceiver is adapted to receive data from each of the plurality of endpoint devices that supports the pre-defined control parameter, and is adapted to request a third communication of a data from each of the plurality of endpoint devices that supports an acknowledgement in a fourth communication.

2. The system of claim 1, wherein the first communication further comprises a clock synchronization frame.

3. The system of claim 1, wherein the configuration control parameter comprises one of a group consisting of a demand reset; time of use bins; seasonal bins and remote disconnection of the meter.

4. The system of claim 3, wherein the at least one transceiver is adapted to request demand data from each of the plurality of endpoint devices that supports a demand reset and to receive the demand data, wherein the demand reset initiated by the endpoint devices is based on internal clocks serving as watchdog timers.

5. The system of claim 4, wherein the transceiver is adapted to acknowledge receipt of the demand data from each of the plurality of endpoint devices that supports a demand reset.

6. A demand reset system for an automatic meter reading (AMR) system comprising:
at least one transceiver, wherein the at least one transceiver includes a geo-coded location information database of plurality of endpoint devices;
wherein each of the plurality of endpoint devices comprises a radio frequency (RF) communication device operably connected to a utility meter and adapted to communicate via RF with the at least one transceiver;
wherein the database includes geo-coded locations of a subset of the plurality of endpoint devices, wherein the subset supports a demand reset,
wherein the at least one transceiver is adapted to request a read and demand data from a first endpoint device in the subset of the plurality of endpoint devices in a first communication when the transceiver determines that it is in communications range of the first endpoint device in the subset of the plurality of endpoint devices, to receive a read and demand data from the first endpoint device in a second communication, and to send an acknowledgement to the first endpoint device in a third communication,
and wherein the first endpoint device is adapted to reset the demand data and send an acknowledgement to the at least one transceiver in a fourth communication.

7. A demand reset system for an automatic meter reading (AMR) system comprising:
at least one transceiver; and
a plurality of endpoint devices, wherein each of the plurality of endpoint devices comprises a radio frequency (RF) communications device operably connected to a utility meter and adapted to communicate via RF with at least one transceiver, wherein a subset of the plurality of endpoint devices supports demand reset, and wherein each of the subset of the plurality of endpoint devices further comprises a timer having a maximum duration defining a current cycle;

wherein the at least one transceiver is adapted to request a read and demand data from a first endpoint device in the subset of the plurality of endpoint devices in a first communication, and
wherein the first endpoint device is adapted to send current demand data to the at least one reader in a second communication, start the timer, save the current demand data to an archive register, and reset the current demand data.

8. The system of claim 7, wherein if the second communication with the first endpoint device fails, the at least one transceiver is adapted to request read and demand data from the first endpoint device in a third communication, and wherein the first endpoint device is adapted to send the demand data from the archive register to the at least one transceiver in a fourth communication if the third communication occurs during the current cycle.

9. The system of claim 7, wherein the at least one transceiver is adapted to request a new demand read from the first endpoint device during the current cycle, the first endpoint device adapted to generate and send the new demand read to the at least one reader.

10. The system of claim 9, wherein the first endpoint device is adapted to restart the timer after sending the new demand read.

11. A method for resetting demand data in a plurality of utility meters, wherein at least one transceiver and a plurality of endpoint devices are adapted to exchange two-way wireless communications, and wherein each of the plurality of endpoint devices comprises a radio frequency (RF) communications device operably connected to a utility meter, the method comprising the steps of:
requesting demand data from at least one endpoint device by the transceiver;
receiving demand data from the at least one endpoint device;
requesting a demand reset from the endpoint device by the transceiver;
receiving a demand reset acknowledgement by the transceiver from the endpoint device:
determining whether the endpoint device supports demand reset;
if the endpoint device supports demand reset, requesting demand data from the endpoint device by the transceiver; and
receiving a demand data reset confirmation by the reader from the endpoint device.

12. A method of remotely configuring at least one utility measurement device of an automatic meter reading (AMR) system, the utility measurement device including a radio frequency (RF) device adapted to exchange wireless communications with at least one transceiver, the method comprising:
transmitting a confirmation command to the RF device of the utility device; downloading the historical data from the storage register upon receiving a configuration command from a mobile collector; and
configuring the RF device with a special algorithm adapted to provide a back up capability to the utility device such that historical data is temporarily stored in a storage register for a pre-defined time upon receipt of the configuration command.

* * * * *

UNITED STATES PATENT AND TRADEMARK OFFICE
CERTIFICATE OF CORRECTION

PATENT NO. : 7,116,243 B2 Page 1 of 1
APPLICATION NO. : 10/929777
DATED : October 3, 2006
INVENTOR(S) : Schleich et al.

It is certified that error appears in the above-identified patent and that said Letters Patent is hereby corrected as shown below:

Sheet 4, Fig. 6: Strike the word "Interigation" and replace it with the word --Interrogation--

Signed and Sealed this

Ninth Day of January, 2007

JON W. DUDAS
*Director of the United States Patent and Trademark Office*